United States Patent [19]

Nishida et al.

[11] Patent Number: 5,498,479

[45] Date of Patent: Mar. 12, 1996

[54] POWDER COATING

[75] Inventors: Kiyoshi Nishida; Tsutomu Sugiyama; Katsuro Funato; Kenzi Hattori, all of Shizuoka, Japan

[73] Assignee: Tomoegawa Paper Co., Ltd., Tokyo, Japan

[21] Appl. No.: 426,609

[22] Filed: Apr. 21, 1995

[30] Foreign Application Priority Data

Apr. 22, 1994 [JP] Japan ................................. 6-107949
Apr. 6, 1995 [JP] Japan ................................. 7-106994

[51] Int. Cl.$^6$ ................................................. B32B 5/16
[52] U.S. Cl. .................. 428/403; 106/286.8; 106/287.1
[58] Field of Search ......................... 428/403; 106/286.8, 106/287.1

[56] References Cited

U.S. PATENT DOCUMENTS

| | | | |
|---|---|---|---|
| 4,124,734 | 11/1978 | Alterman et al. | 428/403 |
| 4,600,604 | 7/1986 | Suita | 428/403 |
| 4,654,266 | 3/1987 | Kachnik | 428/403 |
| 5,362,566 | 11/1994 | George et al. | 428/403 |
| 5,368,936 | 11/1994 | Braunschweig et al. | 428/403 |

*Primary Examiner*—Morton Foelak
*Attorney, Agent, or Firm*—Cushman Darby & Cushman

[57] ABSTRACT

A powder coating is provided, comprising a particulate material having a particle diameter satisfying the following requirements:

(a) the volume 50% diameter be from 7 to 15 μm;

(b) the proportion by volume of the particles having a particle diameter of not less than 20 μm and those having a particle diameter of not less than 30 μm in the particulate material be not more than 10% and 0%, respectively; and (c) the proportion by population of the particles having a particle diameter of not more than 5 μm in the particulate material be not more than 50%, the particulate material having an external additive attached to the surface thereof, the percent coverage by the external additive determined by the following equation described in the specification being from 30 to 100%. The powder coating can provide a film having a reduced thickness with an improved leveling and hence make it possible to improve the working efficiency and re-use the fractions of the powder coating recycled from the coating process, realizing the reduction of the total cost.

5 Claims, No Drawings

POWDER COATING

FIELD OF THE INVENTION

The present invention relates to a powder coating adapted for thin coating.

BACKGROUND OF THE INVENTION

It is well known that a powder coating is less volatile and malodorous than a solvent coating and thus is very useful from the standpoint of environmental protection and regulation.

Powder coatings which have heretofore been commercially available have an average particle size of about 30 μm and a broad particle size distribution because of rough classification.

On the other hand, the market demands the improvement of leveling, the reduction of the film thickness that leads to the enhancement of the working efficiency, the reduction of the total cost, etc.

The film obtained with the prior art powder coating cannot exhibit a good leveling unless it consists of two or more particle layers. Thus, the thin layer of the prior art powder coating is about 50 μm at minimum. Further, since the prior art powder coating has a broad particle diameter distribution, it can easily cause roughness on the film surface due to coarse particles. Thus, no prior art powder coatings can meet the foregoing demands yet.

Further, when an electrostatic apparatus, which is dominant in the powder coating process, is used for coating, the surface to be coated attracts highly chargeable particles (those having a large particle diameter) more easily than others. The unapplied and recycled fractions of the powder coating quite differ in properties from the original product. When re-used, the fractions thus recycled cause a drop of coating efficiency and film properties.

SUMMARY OF THE INVENTION

It is therefore an object of the present invention to provide a powder coating which can provide a film having a reduced thickness (e.g., 15 to 50 μm) with an improved leveling and hence make it possible to improve the working efficiency and re-use the fractions of the powder coating recycled from the coating process, realizing the reduction of the total cost.

The foregoing object of the present invention will become more apparent from the following detailed description and examples.

The present invention provides a powder coating, comprising a particulate material, made of at least a binder resin and a hardener, having a particle diameter satisfying the following requirements:

(a) the volume 50% diameter be from 7 to 15 μm;

(b) the proportion by volume of the particles having a particle diameter of not less than 20 μm and those having a particle diameter of not less than 30 μm in the total particulate material be not more than 10% and 0%, respectively; and (c) the proportion by population of the particles having a particle diameter of not more than 5 μm in the total particulate material be not more than 50%.

The particulate material having an external additive attached to the surface thereof, the percent coverage by the external additive determined by the following equation being from 30 to 100%:

$$X = \frac{dt}{da} \cdot \frac{\rho t}{\rho a} \cdot W[\%]$$

wherein dt represents the population 50% diameter of the particulate material; da represents the primary particle diameter of the external additive; ρt represents the true specific gravity of the particulate material; ρa represents the true specific gravity of the external additive; and W represents the percent proportion by weight of the external additive in the sum of the weight of the particulate material and the external additive.

DETAILED DESCRIPTION OF THE INVENTION

The present invention will be further described hereinafter.

The powder coating of the present invention comprises a particulate material comprising at least a binder resin and a hardener and an external additive.

The content of the binder is preferably from 50 to 90% by weight based on the powder coating. Examples of the binder resin include epoxy resin, acrylic resin, phenolic resin, xylene resin, urea resin, melamine resin and polyester resin.

The content of the hardener is preferably from 2 to 20% by weight based on the powder coating. Examples of the hardener include isocyanate, amine, polyamide, acid anhydride, polysulfide, trifluoroboric acid, acid dihydrazide, and imidazole.

The particulate material may comprise a filler such as barium sulfate, calcium carbonate, aluminum oxide and calcium silicate, a leveling agent such as acryl oligomer and silicone, a coloring agent such as titanium oxide, chromium oxide, iron oxide and carbon black, an anti-foaming agent, etc. as necessary. These components may be added in a total amount of from 5 to 40% by weight based on the powder coating.

In the present invention, the foregoing materials may be dry-blended, hot-melted and kneaded, crushed, and then classified to obtain a desired particulate material. Alternatively, the foregoing materials may be subjected to polymerization such as suspension polymerization and emulsion polymerization to obtain a desired particulate material.

The distribution of the particle diameter of the particulate material needs to be so sharp that the following requirements are satisfied:

(a) the volume 50% diameter be from 7 to 15 μm;

(b) the proportion by volume of the particles having a particle diameter of not less than 20 μm and those having a particle diameter of not less than 30 μm in the total particulate material be not more than 10% and 0%, respectively; and (c) the proportion by population of the particles having a particle diameter of not more than 5 μm in the total particulate material be not more than 50%.

The term "volume 50% diameter" as used herein means "the diameter of the particles which accumulated ratio of volume distribution provides 50% of the total volume of the particles constituting the particulate material".

Particulate materials of which particle diameter distribution deviate from the above specified range exhibit a broad particle diameter distribution and hence a remarkably reduced fluidity and thus cannot provide a uniform powder coating layer on the surface of the material to be film. Thus, selective attachment can occur to form a rough film surface.

A method of preparing a particulate material having a particle diameter distribution falling within the above specified range by the crushing and classification method comprises crushing the hot-melt and kneaded material by a high pressure gas stream type crusher (such as a jet mill or a micron jet) at the crushing step to obtain finer particles, and conducting classification.

For the measurement of the particle diameter distribution, a Coulter Counter Model TA-II, manufactured by COULTER ELECTRONICS, INC., may be used. The particulate material to be tested is suspended in water with a surface active agent, and then dispersed in water by means of an ultrasonic disperser for 30 seconds. The measurement is conducted at the state where the dispersion has a concentration (indicated by a concentration meter attached to Coulter Counter Model TA-II) of is from 5 to 9%.

In the present invention, the particulate material having a particle diameter distribution falling with the above specified range needs to have an external additive attached thereto to have excellent fluidity and storage stability and provide uniform chargeability of each particle. The percent coverage X by the external additive determined by the following equation needs to be from 30 to 100%:

$$X = \frac{dt}{da} \cdot \frac{\rho t}{\rho a} \cdot W[\%]$$

wherein dt represents the population 50% diameter of the particulate material; da represents the primary particle diameter of the external additive; $\rho t$ represents the true specific gravity of the particulate material; $\rho a$ represents the true specific gravity of the external additive; and W represents the percent proportion by weight of the external additive in the sum of the weight of the particulate material and the external additive.

The term "population 50% diameter" as used herein means the diameter of the particles which accumulated ratio of population distribution provides 50% of the total population of the particles constituting the particulate material.

If the percent coverage by the external additive falls below 30%, the resulting powder coating cannot be provided with a sufficient fluidity and thus exhibits a poor storage stability and leaves something to be desired in the uniformity of film obtained therefrom. On the contrary, if the percent coverage by the external additive exceeds 100%, some part of the external additive is free from the surface of the particulate material to roughen the film surface, providing the powder coating with a ununiform chargeability that gives a poor uniformity in the film. For obtaining a film having excellent levelling, the percent coverage X is preferably from 40 to 60%.

In order to measure the true specific gravity of the particulate material and the external additive, a Beckmann true specific gravity hydrometer may be used. For the measurement of particle diameter, a Coulter Counter Model TA-II may be used as mentioned above. For the measurement of the primary particle diameter of the external additive, an electron microscope can be used.

Examples of the external additive include hydrophobic silica, titanium oxide, alumina, polyvinylidene fluoride, metallic soap, and nonionic surface active agent. Particularly preferred among these external additives are particulate hydrophobic silica, titanium oxide and alumina each having a primary particle diameter of less than 1 μm, which can be easily attached to the surface of the particulate material. If the primary particle diameter is more than 1 μm, there is a possibility that the external additive is liable to be released from the surface of the particulate material, causing the agglomeration of the powder coating and the ununiformization of chargeability and hence roughening the film surface.

In order to attach the external additive to the surface of the particulate material, a high-velocity mixer such as Henschel mixer available from Mitsui Miike Co., Ltd. and Super Mixer available from Kawata Seisakusho K.K. can be used to dry-blend the two components.

The powder coating of the present invention preferably exhibits a glass transition point (Tg) of 55° C. to 70° C. to enhance storage stability of the powder coating and leveling of the film. The glass transition point of the powder coating can be determined by means of a DSC (Differential Scanning Calorimeter) measuring instrument.

The present invention will be further described in the following examples, but the present invention should not be construed as being limited thereto.

EXAMPLES

EXAMPLE 1

(1) Preparation of Particulate Material

Polyester resin (ER-6680, available from Nippon Ester Co., Ltd.) 55.8% by weight Block isocyanate (BF-1540, available from Daicel Huls Ltd.) 10.2% by weight Titanium dioxide (CR-90, available from Ishihara Sangyo Kaisha, Ltd.) 33.0% by weight Leveling agent (Acronal 4F, available from BASF ) 0.66% by weight Anti-foaming agent (Benzoin, available from Midori Chemical Co., Ltd.) 0.34% by weight The foregoing materials were mixed in the foregoing ratio by means of a super mixer, hot-melted and kneaded at a temperature of 130° C. by means of a pressure kneader, crushed by means of a jet mill, and then classified by means of a dry gas stream classifier such that the resulting particulate material has a particle diameter distribution shown in Table 1, to thereby obtain particulate materials A to H. The particle diameter distribution was one measured using a Coulter Counter Model TA-II.

TABLE 1

| | Particulate Material | | | | | | | |
|---|---|---|---|---|---|---|---|---|
| | Comparison | | Invention | | | Comparison | | |
| | A | B | C | D | E | F | G | H |
| Volume 50% diameter (μm) | 6.5 | 7.0 | 7.0 | 11.0 | 15.0 | 15.0 | 15.0 | 15.5 |
| Proportion by vol. of particles having a particle diameter of | 0 | 0 | 0 | 2.0 | 9.5 | 10.5 | 9.5 | 9.5 |

TABLE 1-continued

| | Particulate Material | | | | | | | |
|---|---|---|---|---|---|---|---|---|
| | Comparison | | Invention | | | Comparison | | |
| | A | B | C | D | E | F | G | H |
| not less than 20 μm (%) | | | | | | | | |
| Proportion by vol. of particles having a particle diameter of not less than 30 μm (%) | 0 | 0 | 0 | 0 | 0 | 0 | 1.0 | 0 |
| Proportion by population of particles having a particle diameter of not more than 5 μm (%) | 48.0 | 52.0 | 48.0 | 25.0 | 10.0 | 9.0 | 10.0 | 5.0 |

(2) Preparation of Powder Coating

A hydrophobic silica (HVK-2150, available from Wacker Chemicals Ltd.) was attached to the surface of the particulate materials A to H by means of a Henschel mixer available from Mitsui Miike Co., Ltd. such that the percent coverage reached 25%, 30%, 100% and 105%, respectively, to obtain desired powder coatings.

All the powder coatings had a Tg of 65° C.

(3) Evaluation

The various powder coatings thus obtained were each sprayed on to a bright-finished zinc phosphate-treated steel plate (SPCC-SB plate) by means of a tribomatic powder coating system available from Nordson Corporation, and then baked at a temperature of 200° C. to form a film. The surface of the film was then visually evaluated. The results are set forth in Table 2. The measurement of the thickness of the film was effected at the thinnest thickness with no abnormality such as mottles or graininess when the powder coating layer adhered after spraying was observed visually. The evaluation was made in accordance with the following criteria:

Good . . . Uniform layer thickness, no rough film surface

Fair . . . Slightly ununiform layer thickness, slightly rough film surface

Poor . . . Ununiform layer thickness, rough film surface

TABLE 2

| Particulate Material | Percent Coverage | | | | Layer Thickness (μm) |
|---|---|---|---|---|---|
| | 1 (25%) | 2 (30%) | 3 (100%) | 4 (105%) | |
| A | Poor | Poor | Poor | Poor | 20 |
| B | Poor | Fair | Fair | Poor | 20 |
| C | Fair | Good | Good | Fair | 20 |
| D | Fair | Good | Good | Fair | 30 |
| E | Fair | Good | Good | Fair | 40 |
| F | Poor | Fair | Fair | Poor | 40 |
| G | Poor | Poor | Poor | Poor | 40 |
| H | Poor | Poor | Poor | Poor | 40 |

As can be seen in Table 2, the powder coatings C-2 (i.e., Particulate Material C, Coverage 30%), C-3, D-2, D-3, E-2 and E-3 according to the present invention provided a uniform film thickness and no rough film surface.

On the other hand, the powder coatings H-1 to H-4 provided a film surface with graininess due to coarse particles. The powder coatings A-1 to A-4 which had a great content of fine particles and thus gave ununiform chargeability, resulting in the film surface with unevenness or roughness. All the powder coatings with a percent coverage by external additive of 25% (A-1, B-1, C-1, D-1, E-1, F-1, G-1, H-1) exhibited a poor fluidity and gave ununiform chargeability, resulting in the generation of unevenness or roughness on the film surface. All the powder coatings with a percent coverage by external additive of 105% (A-4, B-4, C-4, D-4, E-4, F-4, G-4, H-4) exhibited ununiform chargeability possibly due to free external additive, resulting in a roughened film surface with satin touch. The powder coatings B-2 and B-3 had a greater volume 50% diameter than the powder coatings A-1 to A-4 but had a large content of particles having a particle diameter of not more than 5 μm and hence a broad particle diameter distribution. Thus, these powder coatings had a good fluidity but gave a film surface with unevenness or roughness possibly due to the fine particles. The powder coatings F-2 and F-3 had a large content of particles having a particle diameter of not less than 20 μm and thus showed some graininess due to the coarse particles. The powder coatings G-2 and G-3 showed a graininess to a relatively great extent similarly to the powder coatings F-2 and F-3.

With respect to the above-prepared powder coatings C-2, D-3, E-2, A-1, A-4, H-1, and H-4, the comparison between the powder coatings recycled after coating (i.e., those sprayed but uncoated on the plate) and the original powder coatings before coating is conducted as follows.

The particle diameter distribution of the recycled powder coatings was measured using a Coulter Counter Model TA-II. The results are shown in Table 3 below.

The apparent density of the recycled powder coatings and original powder coatings was measured according to JIS K 5101$^{-1991}$, Item 20.1 The results are shown in Table 4 below The tribo-chargeability was measured by means of a blow-off charge meter manufactured by Toshiba Chemical Corporation using a mixture of the powder coating and a ferrite powder of which the surface was coated with fluorine, with the content of the former being 5% by weight. The results are shown in Table 5 below.

TABLE 3

| | Particulate Material | | | | | | |
|---|---|---|---|---|---|---|---|
| | Invention | | | Comparison | | | |
| | C-2 | D-3 | E-2 | A-1 | A-4 | H-1 | H-4 |
| Volume 50% diameter (μm) | 7.0 | 11.0 | 14.8 | 6.0 | 5.0 | 14.0 | 13.0 |
| Proportion by vol. of particles having a particle diameter of not less than 20 μm (%) | 0 | 1.8 | 9.1 | 2.0 | 0 | 8.0 | 5.0 |
| Proportion by vol. of particles having a | 0 | 0 | 0 | 0 | 0 | 1.0 | 0 |

TABLE 3-continued

| | Particulate Material | | | | | | |
|---|---|---|---|---|---|---|---|
| | Invention | | | Comparison | | | |
| | C-2 | D-3 | E-2 | A-1 | A-4 | H-1 | H-4 |
| particle diameter of not less than 30 μm (%) | | | | | | | |
| Proportion by population of particles having a particle diameter of not more than 5 μm (%) | 49.0 | 26.0 | 12.0 | 60.0 | 70.0 | 20.0 | 30.0 |

TABLE 4

| Powder Coating | Apparent Density | |
|---|---|---|
| | Before Coating (g/ml) | Recycled One After Coating (g/ml) |
| C-2 (Invention) | 0.47 | 0.48 |
| D-3 (Invention) | 0.55 | 0.54 |
| E-2 (Invention) | 0.57 | 0.58 |
| A-1 (Comparison) | 0.32 | 0.26 |
| A-4 (Comparison) | 0.40 | 0.25 |
| H-1 (Comparison) | 0.60 | 0.51 |
| H-4 (Comparison) | 0.65 | 0.54 |

TABLE 5

| Powder Coating | Tribo-chargeability | |
|---|---|---|
| | Before Coating (μc/g) | Recycled One After Coating (μc/g) |
| C-2 (Invention) | 25.5 | 25.7 |
| D-3 (Invention) | 21.0 | 20.8 |
| E-2 (Invention) | 17.0 | 17.3 |
| A-1 (Comparison) | 28.5 | 30.8 |
| A-4 (Comparison) | 31.0 | 35.2 |
| H-1 (Comparison) | 13.0 | 16.0 |
| H-4 (Comparison) | 14.5 | 17.1 |

It can be seen from the above results that with respect to powder coatings C-2, D-3, and E-2 according to the present invention, the recycled powder coatings did not exhibit a remarkable change from the original powder coatings in the particle diameter distribution, apparent density and tribo-chargeability. Thus, it was confirmed that these recycled powder coatings have no problem in fluidity and chargeability. With respect to the comparative powder coatings A-1, A-4, H-1, and H-4, the recycled powder coatings each exhibited a change in the particle diameter distribution, and a smaller apparent density than that of the original powder coating. It was confirmed that these recycled powder coatings exhibited deteriorated fluidity and different tribo-chargeability as compared with the original powder coatings.

In the case that only recycled powder coating was used for coating, powder coatings C-2, D-3 and E-2 according to the present invention provided a film with uniform thickness and no rough film surface.

EXAMPLE 2

The materials shown below were mixed in the mixing ratio shown below by means of a super mixer, hot-melted and kneaded at a temperature of 130° C. by means of a pressure kneader, crushed by means of a jet mill, and then classified by means of a dry gas stream classifier to prepare a particulate material satisfying the requirements that the volume 50% diameter thereof be 10 μm, the percent proportion by volume of particles having a particle diameter of not less than 20 μm in the total particulate material be 5%, the percent proportion by volume of particles having a particle diameter of not less than 30 μm in the total particulate material be 0% and the percent proportion by population of particles having a particle diameter of not more than 5 μm in the total particulate material be 25%. A hydrophobic silica (HVK-2150, available from Wacker Chemicals Ltd.) was attached to the surface of the particulate material by means of a Henschel mixer available from Mitsui Miike Co., Ltd. such that the percent coverage reached 50% to obtain a desired powder coating.

The resulting powder coating had a Tg of 67° C.

Epoxy resin (YD-014, available from Tohto Kasei Co., Ltd.) 35.9% by weight

Epoxy resin (YD-017, available from Tohto Kasei Co., Ltd.) 35.9% by weight

Dicyandiamide (DICY, available from Nippon Carbide Industries Co., Inc.) 2.9% by weight Titanium dioxide (CR-90, available from Ishihara Sangyo Kaisha., Ltd.) 24.0% by weight Carbon black (MA-100, available from Mitsubishi Kasei Corporation) 0.30% by weight Leveling agent (Acronal 4F, available from BASF) 0.66% by weight Anti-foaming agent (Benzoin, available from Midori Chemical Co., Ltd.) 0.34% by weight The powder coating thus obtained was sprayed on to a bright-finished zinc phosphate-treated steel plate (SPCC-SB plate) by means of a tribomatic powder coating system available from Nordson Corporation, and then baked at a temperature of 180° C. to form a film having a thickness of 30 μm. The surface of the film was then visually evaluated. As a result, it was found that the resulting coat showed a uniform thickness and no roughness.

EXAMPLE 3

The materials shown below were mixed in the mixing ratio shown below by means of a super mixer, hot-melted and kneaded at a temperature of 130° C. by means of a pressure kneader, crushed by means of a jet mill, and then classified by means of a dry gas stream classifier to prepare a particulate material satisfying the requirements that the volume 50% diameter thereof be 10 μm, the percent proportion by volume of particles having a particle diameter of not less than 20 μm in the total particulate material be 5%, the percent proportion by volume of particles having a particle diameter of not less than 30 μm in the total particulate material be 0% and the percent proportion by population of particles having a particle diameter of not more than 5 μm in the total particulate material be 25%. Alumina (RFY-C, available from Nippon Aerosil Co., Ltd.) was attached to the surface of the particulate material by means of a Henschel mixer available from Mitsui Miike Co., Ltd. such that the percent coverage reached 50%, to thereby obtain a desired powder coating.

The resulting powder coating had a Tg of 65° C.

Polyester resin (ER-6680, available from Nippon Ester Co., Ltd.) 55.8% by weight Block isocyanate (BF-1540, available from Daicel Huls Ltd.) 10.2% by weight Titanium dioxide (CR-90, available from Ishihara Sangyo Kaisha., Ltd.) 33.0% by weight Leveling agent (Acronal 4F, available from BASF) 0.66% by weight Anti-foaming agent (Benzoin, available from Midori Chemical Co., Ltd.) 0.34% by weight The powder coating thus obtained was used for coating in the same manner as described above to provide a film having a thickness of 30 μm. The surface of the film was then observed. As a result, it was found that the resulting film showed a uniform thickness and no roughness.

Furthermore, a powder coating was prepared in the same manner as above except that titanium oxide was attached to the particulate material in place of alumina such that the percent coverage reached 50%. As a result, it was found that the resulting film showed a uniform thickness and no roughness.

As mentioned above, the present invention can provide a powder coating which can be applied to a reduced thickness to form a film having a uniform thickness and being free of roughness by properly specifying the distribution of particle diameter of the particulate material and the conditions under which the external additive is added.

Further, the fractions of the powder coating of the present invention which have been unapplied on coating and recycled shows little or no difference in properties from the original powder coating and thus can be re-used. Moreover, since the powder coating of the present invention can be applied to a reduced thickness, the amount of the powder coating required for coating can be minimized, reducing the coating cost.

While the invention has been described in detail and with reference to specific embodiments thereof, it will be apparent to one skilled in the art that various changes and modifications can be made therein without departing from the spirit and scope thereof.

What is claimed is:

1. A powder coating, comprising a particulate material made of at least a binder resin and a hardener, said particulate material has a particle diameter satisfying the following requirements:

(a) the volume 50% diameter be from 7 to 15 μm;

(b) the proportion by volume of the particles having a particle diameter of not less than 20 μm and those having a particle diameter of not less than 30 μm in the particulate material be not more than 10% and 0%, respectively; and (c) the proportion by population of the particles having a particle diameter of not more than 5 μm in the particulate material be not more than 50%, and has an external additive attached to the surface thereof, the percent coverage by the external additive determined by the following equation being from 30 to 100%:

$$X = \frac{dt}{da} \cdot \frac{\rho t}{\rho a} \cdot W[\%]$$

wherein dt represents the population 50% diameter of the particulate material; da represents the primary particle diameter of the external additive; ρt represents the true specific gravity of the particulate material; ρa represents the true specific gravity of the external additive; and W represents the percent proportion by weight of the external additive in the sum of the weight of the particulate material and the external additive.

2. The powder coating of claim 1, wherein the external additive is at least one selected from the group consisting of hydrophobic silica, titanium oxide, and alumina, each having a primary particle diameter of less than 1 μm.

3. The powder coating of claim 1, wherein the powder coating contains the binder in an amount of 50 to 90% by weight.

4. The powder coating of claim 1, wherein the percent coverage by the external additive is from 40 to 60%.

5. The powder coating of claim 1, wherein the powder coating has a Tg of 55° to 70° C.

* * * * *